(12) United States Patent
Ekkizogloy et al.

(10) Patent No.: US 8,819,423 B2
(45) Date of Patent: Aug. 26, 2014

(54) OPTICAL TRANSCEIVER WITH VENDOR AUTHENTICATION

(75) Inventors: Luke M. Ekkizogloy, Mountain View, CA (US); Gerald L. Dybsetter, Scotts Valley, CA (US); Jason Y. Miao, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 705 days.

(21) Appl. No.: 12/323,731

(22) Filed: Nov. 26, 2008

(65) Prior Publication Data

US 2009/0138709 A1    May 28, 2009

Related U.S. Application Data

(60) Provisional application No. 60/990,546, filed on Nov. 27, 2007.

(51) Int. Cl.
| | | |
|---|---|---|
| *H04L 9/32* | (2006.01) | |
| *G06F 21/44* | (2013.01) | |
| *G06F 21/10* | (2013.01) | |
| *G06F 11/30* | (2006.01) | |
| *G06F 12/14* | (2006.01) | |
| *G06F 21/00* | (2013.01) | |

(52) U.S. Cl.
CPC ............... *G06F 21/44* (2013.01); *G06F 21/00* (2013.01); *G06F 21/10* (2013.01)
USPC ............................ 713/168; 713/171; 713/189

(58) Field of Classification Search
CPC ....... G06F 21/44; G06F 21/445; G06F 21/00; G06F 21/10; G06F 21/30
USPC .......................................... 713/168, 171, 189
See application file for complete search history.

(56) References Cited

U.S. PATENT DOCUMENTS

| | | | |
|---|---|---|---|
| 4,799,061 A * | 1/1989 | Abraham et al. ............ | 340/5.26 |
| 4,896,319 A | 1/1990 | Lidinsky et al. | |
| 4,905,301 A | 2/1990 | Kropp et al. | |
| 5,351,295 A * | 9/1994 | Perlman et al. ............... | 713/162 |
| 5,909,491 A | 6/1999 | Luo | |
| 6,028,937 A | 2/2000 | Tatebayashi et al. | |
| 6,052,604 A | 4/2000 | Bishop et al. | |

(Continued)

FOREIGN PATENT DOCUMENTS

EP            898397           2/1999

OTHER PUBLICATIONS

"Microsoft Computer Dictionary 5$^{th}$ Edition", 2002, Microsoft Press, 5$^{th}$ Edition, p. 337.*

(Continued)

*Primary Examiner* — Evans Desrosiers
*Assistant Examiner* — Daniel Potratz
(74) *Attorney, Agent, or Firm* — Maschoff Brennan

(57) ABSTRACT

An optical receiver comprising at least one processor and a memory including at least one of an encryption key or a decryption key and at least one of encryption microcode or decryption microcode that includes processor-executable instructions that, when executed by the at least one processor, cause the optical transceiver to perform the following: an act of performing an encryption or decryption operation on data received from a host computing system to thereby authenticate the optical transceiver.

13 Claims, 3 Drawing Sheets

(56) References Cited

U.S. PATENT DOCUMENTS

| | | | |
|---|---|---|---|
| 6,058,476 A | 5/2000 | Matsuzaki | |
| 6,128,389 A | 10/2000 | Chan et al. | |
| 6,223,042 B1 | 4/2001 | Raffel | |
| 6,240,517 B1 | 5/2001 | Nishioka | |
| 6,253,322 B1 | 6/2001 | Susaki et al. | |
| 6,362,869 B1 | 3/2002 | Silverbrook | |
| 6,370,249 B1 | 4/2002 | Van Oorschot | |
| 6,374,354 B1 | 4/2002 | Walmsley et al. | |
| 6,442,525 B1 | 8/2002 | Silverbrook et al. | |
| 6,493,825 B1 | 12/2002 | Blumrnau et al. | |
| 6,760,752 B1 | 7/2004 | Liu et al. | |
| 6,938,166 B1 | 8/2005 | Sarfati et al. | |
| 7,042,406 B2 | 5/2006 | McFarland et al. | |
| 7,149,430 B2 | 12/2006 | Hosking et al. | |
| 7,197,298 B2 | 3/2007 | Azuma | |
| 7,313,697 B2 * | 12/2007 | Meyer et al. | 713/168 |
| 7,356,357 B2 | 4/2008 | DeCosta et al. | |
| 7,450,719 B2 | 11/2008 | Lee et al. | |
| 7,580,988 B2 | 8/2009 | Rudd | |
| 7,657,740 B2 | 2/2010 | Numao et al. | |
| 7,681,247 B2 * | 3/2010 | Williams | 726/34 |
| 7,697,691 B2 | 4/2010 | Sutton et al. | |
| 7,716,477 B2 * | 5/2010 | Omori et al. | 713/169 |
| 7,724,907 B2 | 5/2010 | Candelore | |
| 7,734,046 B2 * | 6/2010 | Urban et al. | 380/46 |
| 7,747,541 B2 | 6/2010 | Walmsley et al. | |
| 7,823,214 B2 | 10/2010 | Rubinstein et al. | |
| 2001/0037467 A1 | 11/2001 | O'Toole et al. | |
| 2001/0052850 A1 | 12/2001 | Zimmerman | |
| 2002/0018458 A1 | 2/2002 | Aiello et al. | |
| 2002/0136169 A1 | 9/2002 | Struhsaker et al. | |
| 2002/0137472 A1 | 9/2002 | Quinn et al. | |
| 2002/0164026 A1 | 11/2002 | Huima | |
| 2002/0170960 A1 | 11/2002 | Ehrensvard et al. | |
| 2003/0072059 A1 | 4/2003 | Thomas et al. | |
| 2003/0108199 A1 | 6/2003 | Pinder et al. | |
| 2003/0113118 A1 | 6/2003 | Bartur | |
| 2003/0128411 A1 | 7/2003 | Aronson et al. | |
| 2003/0159036 A1 | 8/2003 | Walmsley et al. | |
| 2003/0172268 A1 | 9/2003 | Walmsley et al. | |
| 2003/0188175 A1 | 10/2003 | Volk et al. | |
| 2004/0052377 A1 | 3/2004 | Mattox et al. | |
| 2004/0064699 A1 | 4/2004 | Hooker et al. | |
| 2004/0081079 A1 | 4/2004 | Forest et al. | |
| 2004/0177369 A1 | 9/2004 | Akins | |
| 2004/0249817 A1 | 12/2004 | Liu et al. | |
| 2005/0085193 A1 | 4/2005 | Stromberg et al. | |
| 2005/0113068 A1 | 5/2005 | Hoffman | |
| 2005/0113069 A1 | 5/2005 | Knauerhase et al. | |
| 2005/0203582 A1 | 9/2005 | Healy et al. | |
| 2006/0117181 A1 | 6/2006 | Brickell | |
| 2006/0156415 A1 * | 7/2006 | Rubinstein et al. | 726/27 |
| 2006/0232376 A1 | 10/2006 | Blaker | |
| 2007/0083491 A1 | 4/2007 | Walmsley | |
| 2007/0092258 A1 | 4/2007 | Nelson | |
| 2007/0130254 A1 | 6/2007 | Russ et al. | |
| 2007/0177879 A1 | 8/2007 | Hsieh | |
| 2007/0180515 A1 * | 8/2007 | Danilak | 726/16 |
| 2007/0192599 A1 | 8/2007 | Kato et al. | |
| 2008/0267408 A1 | 10/2008 | Hsieh | |

OTHER PUBLICATIONS

Menezes et al., *Handbook of Applied Cryptography*, 1997, pp. 397,398,403-405,548,549,559,560.

Menezes et al., *Handbook of Applied Cryptography*, Chapter 1, CRC Press, 1996.

200410095201.0, Apr. 2008, Chinese Office Action.

04090443.5, Mar. 2006, EPO Office Action.

04090443, Apr. 2005, European Search Report.

U.S. Appl. No. 12/251,139, Mar. 2011, Office Action.

U.S. Appl. No. 10/718,753, Sep. 2010, Office Action.

U.S. Appl. No. 10/718,753, May 2010, Office Action.

U.S. Appl. No. 10/718,753, Nov. 2009, Office Action.

U.S. Appl. No. 10/718,753, Mar. 2009, Office Action.

U.S. Appl. No. 10/718,753, Aug. 2008, Office Action.

U.S. Appl. No. 10/718,753, Apr. 2008, Office Action.

U.S. Appl. No. 11/739,539, Jun. 2010, Office Action.

U.S. Appl. No. 11/739,539, Nov. 2010, Office Action.

U.S. Appl. No. 12/264,194, Sep. 2010, Office Action.

U.S. Appl. No. 10/718,753, Mar. 2011, Office Action.

U.S. Appl. No. 11/739,539, Jul. 2011, Office Action.

U.S. Appl. No. 12/264,194, Apr. 2011, Office Action.

* cited by examiner

OPTICAL TRANSCEIVER WITH VENDOR AUTHENTICATION

CROSS-REFERENCE TO RELATED APPLICATIONS

This application claims the benefit of U.S. Provisional Patent Application Ser. No. 60/990,546, entitled OPTICAL TRANSCEIVER WITH VENDOR AUTHENTICATION, filed Nov. 27, 2007, and incorporated herein in its entirety by this reference.

BACKGROUND

1. The Field of the Invention

The present invention relates generally to optical transceivers, transmitters and receivers. More specifically, the present invention relates to optical transceivers that include a mechanism to allow a host system to authenticate the optical transceiver's origin.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

Controllers are typically implemented in hardware as state machines. Their operation is fast, but inflexible. Being primarily state machines, the functionality of the controller is limited to the hardware structure of the controller.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first embodiment relates to a method for allowing an optical transceiver to be authenticated by a host computing system. The method may be performed in an environment that includes an optical transceiver communicatively coupled to a host computing system. The optical transceiver includes a processor and a memory having thereon encryption/decryption microcode that, when executed, causes the optical transceiver to perform an encryption or decryption operation. The method comprises an act of receiving data from a host computing system and an act of performing an encryption or decryption operation on the data to thereby authenticate the optical transceiver.

A further embodiment relates to a method for allowing an optical transceiver to be authenticated by a host computing system. The method may be performed in an environment that includes an optical transceiver communicatively coupled to a host computing system. The optical transceiver includes a processor and a memory having thereon decryption microcode that, when executed, causes the optical transceiver to perform a decryption operation. The method comprises an act of receiving encrypted data from a host computing system, an act of receiving unencrypted data from the host computing system, an act of performing a decryption operation using decryption microcode to thereby decrypt the encrypted data, and an act of comparing the decrypted data with the unencrypted data to verify that the optical transceiver is authentic.

A further embodiment relates to an optical receiver comprising at least one processor and a memory including at least one of an encryption key or a decryption key and at least one of encryption microcode or decryption microcode that includes processor-executable instructions that, when executed by the at least one processor, cause the optical transceiver to perform the following: an act of performing an encryption or decryption operation on data received from a host computing system to thereby authenticate the optical transceiver.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

A first embodiment relates to a method for allowing an optical transceiver to be authenticated by a host computing system. The method may be performed in an environment that includes an optical transceiver communicatively coupled to a host computing system. The optical transceiver includes a processor and a memory having thereon encryption/decryption microcode that, when executed, causes the optical transceiver to perform an encryption or decryption operation. The method comprises an act of receiving data from a host computing system and an act of performing an encryption or decryption operation on the data to thereby authenticate the optical transceiver.

A further embodiment relates to a method for allowing an optical transceiver to be authenticated by a host computing system. The method may be performed in an environment that includes an optical transceiver communicatively coupled to a host computing system. The optical transceiver includes a processor and a memory having thereon decryption microcode that, when executed, causes the optical transceiver to perform a decryption operation. The method comprises an act of receiving encrypted data from a host computing system, an act of receiving unencrypted data from the host computing system, an act of performing a decryption operation using decryption microcode to thereby decrypt the encrypted data, and an act of comparing the decrypted data with the unencrypted data to verify that the optical transceiver is authentic.

A further embodiment relates to an optical receiver comprising at least one processor and a memory including at least one of an encryption key or a decryption key and at least one of encryption microcode or decryption microcode that includes processor-executable instructions that, when executed by the at least one processor, cause the optical transceiver to perform the following: an act of performing an encryption or decryption operation on data received from a host computing system to thereby authenticate the optical transceiver.

Reference will now be made to figures wherein like structures will be provided with like reference designations. It is understood that the drawings are diagrammatic and schematic representations of exemplary embodiments of the invention, and are not limiting of the present invention nor are they necessarily drawn to scale. It is also understood that reference to a "first", or a "second" etc. element in this description and in the claims is meant to distinguish one element from another and is not meant to imply sequential ordering unless explicitly stated.

Figure 1:
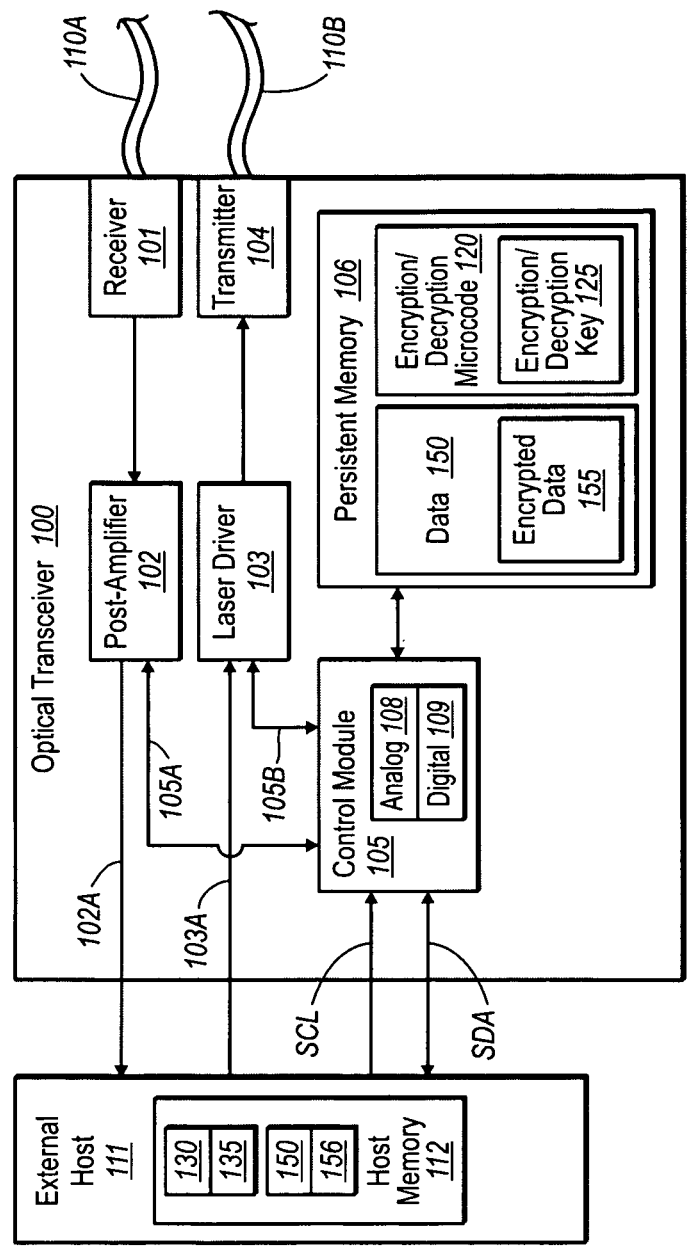
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G, 40 G, 100 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all. Note that the embodiments disclosed herein contemplate that optical transceiver 100 may be a single channel or multi-channel optical module. The embodiments disclosed herein also contemplate that optical transceiver 100 may be part of an active optical cable that includes an optical transceiver on both (or perhaps only one) end of the active cable.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with and/or providing microcode to the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
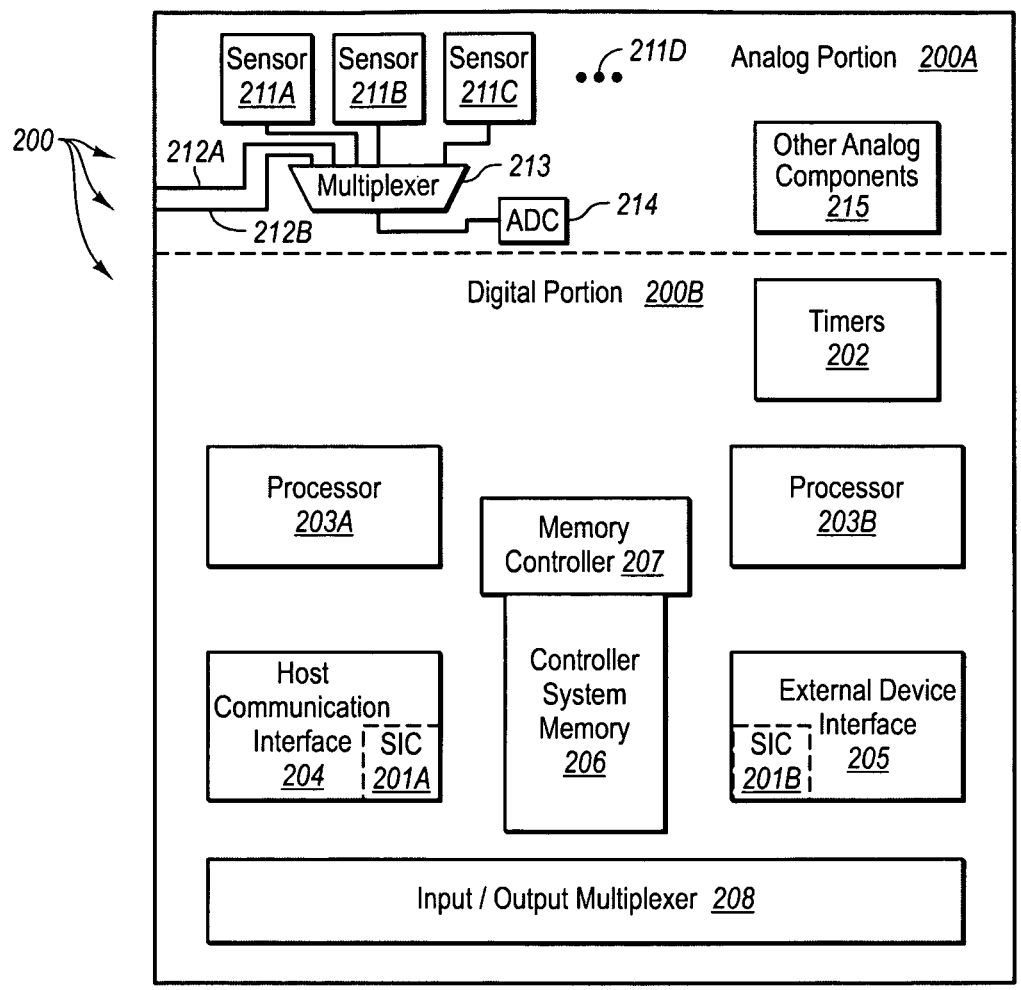
FIG. 2 schematically illustrates an example of a control module of FIG. 1

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C, amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 possibly implemented using a two-wire interface such as I2C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I2C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. The principles of the present invention will be discussed with reference to the environment described in relation to FIGS. 1 and 2.

Typically, an optical transceiver module manufacturer or active optical cable manufacturer sells transceiver modules with proprietary components and functions. The manufacturer will often spend valuable resources and time on developing proprietary components and functions that make the optical transceiver more desirable to potential customers. However, it is often the case that an unauthorized vendor will make and sell optical transceiver with counterfeit versions of the proprietary components and functions. As can be appreciated, such activity causes the manufacturers to lose sales, market share, and good will of the customers who may purchase a defective module. Advantageously, the principles of the present invention provide for mechanisms that allow a host system to verify that the optical transceiver is an authorized version.

During manufacture of optical transceiver 100, the transceiver 100 manufacturer may desire to include encryption/decryption microcode 120 in order to facilitate the verification that the optical transceiver 100 is an authorized version. In some embodiments, encryption/decryption microcode 120 may be added to the optical transceiver after manufacture. The optical encryption/decryption microcode 120 may be stored in one or more write-protected memory locations located in persistent memory 106 or some other accessible memory location. The encryption/decryption microcode 120 includes executable instructions that, when executed by processors 203, at least partially cause the optical transceiver 100 to perform an operation that encrypts and/or decrypts portions of data in the persistent memory 106. In some embodiments, encryption/decryption microcode 120 may include an encryption/decryption key 125 that may be used in the encryption and/or decryption process.

In some embodiments, the encryption/decryption key 125 may not be part of the microcode 120, but rather is stored in a separate portion of persistent memory 106. In still other embodiments, encryption/decryption key 125 may be stored in some non-volatile portion of controller system memory 206. Storing encryption/decryption key 125 in controller system memory 206 would have the advantage of making encryption/decryption key 125 more difficult for an unauthorized party to disassemble. Accordingly, although encryption/decryption key 125 is shown in FIG. 1 as residing on persistent memory 106, the principles of the present invention are not limited by which memory location of transceiver 100 that encryption/decryption key 125 is stored in.

Referring again to FIG. 1, it is illustrated that external host 111 includes encryption/decryption microcode 130 that is stored in host memory 112. As with encryption/decryption microcode 120, encryption/decryption microcode 130 includes executable instructions that when executed by a processor of the host (not illustrated) at least partially cause host 111 to perform an operation that encrypts and/or decrypts portions of data in host memory 112. In some embodiments, encryption/decryption microcode 130 may include an encryption/decryption key 135 that may be used in the encryption and/or decryption process. It will be appreciated by those of skill in the art that in some embodiments encryption/decryption microcode 120 and 130 may be the same microcode and that encryption/decryption key 125 and 135 may be the same key as circumstances warrant.

In operation, control module 105 may read data 150 from host 111 via the I2C interface or some other interface and write this data into persistent memory 106, system memory 206, or any other suitable memory. Alternatively, the data 150 may be written directly by host 111 into persistent memory 106, system memory 206, or any other suitable memory.

Once transceiver 100 has received data 150, processors 203 may then execute encryption/decryption microcode 120 to thereby implement an encryption operation. Examples of such operations include, but are not limited to AES, DES, and TwoFish. In one embodiment, the encryption operation accesses data 150 and encryption key 125 while performing the encryption operation. This results in a representation of data 150, illustrated as encrypted data 155, which is encrypted according to encryption key 125 and unreadable to anyone without a corresponding decryption key.

Transceiver 100 may then provide encrypted data 155 to host 111 over the I2C bus, where it may be stored in host memory 112 or some other reasonable location. Host 111 may then execute encryption/decryption microcode 130, which will cause host 111 to perform a decryption operation. In one embodiment, the decryption operation accesses encrypted data 155 and decryption key 135 while performing the decryption operation. This results in decrypted data 156.

The host 111 may then compare decrypted data 156 with data 150 that was provided to optical transceiver 100. If data 150 and decrypted data 156 match one another, then transceiver 100 is valid and authenticated as the encryption and decryption operation using keys 125 and 135 was able to restore data 150. The host 111 may then continue to communicate with the optical transceiver 100.

On the other hand, if data 150 and decrypted data 156 do not match one another, then optical transceiver 100 is not valid and is not authenticated as the encryption and decryption operation using keys 125 and 135 was unable to restore data 150. In some embodiments the host 111 will cease to communicate with the optical transceiver. In other embodiments, the control module 105 may be configured to disable the optical transceiver 100 or to otherwise limit the use of the optical transceiver. If at a later time the optical transceiver 100 is authenticated, then the control module 105 may be configured to cause the optical transceiver 100 to become fully operational. Accordingly, the encryption and decryption process just described allows a manufacturer of optical transceiver 100 to prevent a counterfeited transceiver from being implemented.

In an additional embodiment, host 111 may encrypt data 150 before providing the data to transceiver 100. In this embodiment, host 111 executes encryption/decryption microcode 130 and uses encryption key 135 to encrypt data 150.

The encrypted data 150 is then provided to optical transceiver 100 over the I2C interface or some other reasonable interface and written into persistent memory 106, system memory 206, or any other suitable memory. Processors 203 then execute encryption/decryption microcode 120, which causes optical transceiver 100 to use decryption key 125 to decrypt data 150.

The host 111 may then verify that data 150 was properly decrypted. If the decrypted data 150 matches original data 150, then optical transceiver 100 is valid and authenticated. Conversely, if the decrypted data 150 does not match the original data 150, then optical transceiver 100 is not valid and is not authenticated. As mentioned above, if the optical transceiver 100 is authenticated, then host 111 will continue to communicate with the optical transceiver 100 and the optical transceiver 100 will be fully operational. However, if the optical transceiver is not authenticated the host 111 may not continue to communicate with the optical transceiver 100. Alternatively, the control module 105 may be configured to disable or limit the operation of the optical transceiver 100.

In still another embodiment, as optical transceiver 100 powers on, transmitter 104 may be turned off and the high speed data link disabled. In order to turn the transmitter on and to enable the high speed data link authentication of the optical transceiver 100 is required.

For example, to enable the optical transceiver module 100, host 111 encrypts data 150 using encryption/decryption microcode 130 and encryption/decryption key 135 as previously described to produce encrypted data 155. Host 111 may then write the encrypted data 155 to persistent memory 106. The host may also write data 150 (i.e., data that is unencrypted) to persistent memory 106 as well. As will be appreciated, the encrypted data 155 will be an encrypted version of the unencrypted data 150 so that a valid comparison may be made as will be explained.

Optical transceiver 100 may then decrypt encrypted data 155 using encryption/decryption microcode 120 and encryption/decryption key 125 as previously described. Optical transceiver 100, specifically control module 105, may then compare data obtained from the decryption operation with the data 150 received from host 111.

If the unencrypted data 150 and received data 150 match, then control module 105 may turn on transmitter 104 and enable the high speed data link. If, on the other hand, the unencrypted data 150 and received data 150 do not match, then transmitter 104 is not turned on and the high speed data link is not enabled. Advantageously, this process helps to prevent an optical transceiver module intended for one customer or application from being used in an unauthorized host device.

Figure 3:
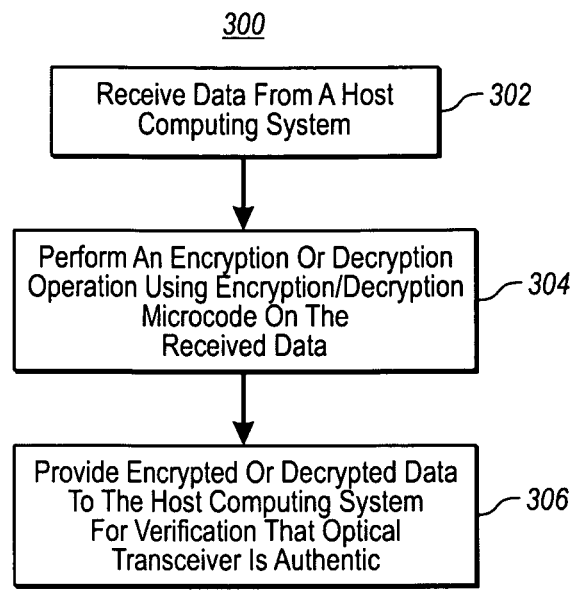
FIG. 3 illustrates a flowchart of a method for an optical transceiver module to be authenticated in accordance with the principles of the present invention.

Reference in now made to FIG. 3, which shows a flowchart of a method 300 for an optical transceiver module to be authenticated by a host computing system. The method 300 is illustrated with respect to the environment of FIGS. 1 and 2. Note, however, that one of skill in the art will appreciate that the environment of FIGS. 1 and 2 is only one of countless environments in which the method 300 may be practiced and should not therefore be used to limit the scope of the appended claims.

Method 300 includes an act of receiving data from a host computing system (act 302). For example, the optical transceiver 100 may receive unencrypted data 150 from the host computing system 111. As mentioned, in some embodiments the controller 105 may write the data into memory 106. In other embodiments, the host 111 may directly write the data 150 into memory 106. Alternatively, the data received from the host 111 may be encrypted data 155.

The method 300 also includes an act of performing an encryption or decryption operation on the data to thereby authenticate the optical transceiver (act 304). In some embodiments the encryption or decryption operation utilizes encryption/decryption microcode to thereby encrypt or decrypt the data received from the host computing system. For example, control module 105, specifically processors 203, may execute the encryption/decryption microcode 120. Once executed, the encryption/decryption microcode 120 may cause the optical transceiver to perform the encryption operation to thereby encrypt the data 150 into encrypted data 155 as previously described.

Alternatively, the executed encryption/decryption microcode 120 may cause the optical transceiver to perform the decryption operation to thereby decrypt the encrypted data 155 into decrypted data 150 as previously described.

As mentioned, in some embodiments the encryption/decryption microcode 120 may include an encryption/decryption key 125 that is used in the encryption and decryption operations. In other embodiments, the encryption/decryption key 125 may be stored separate from the encryption/decryption microcode 120, for instance in system memory 206 and accessed by the encryption/decryption microcode 120. Regardless of where it is stored, the encryption/decryption key 125 may be used to help encrypt data 150 or to decrypt data 155.

The method 300 further includes an act of providing the encrypted data or the decrypted data to the host computing system to verify that the optical transceiver is authentic (act 306). For example, optical transceiver 100 may provide the encrypted data 155 to host 111. Host 111 may then decrypt the encrypted data 155 using microcode 130 and decryption key 135. As mentioned above, the host 111 may then compare the decrypted data 156 with the original data 150.

Likewise, optical transceiver 100 may provide the decrypted data 150 to host 111. Host 111 may then compare the decrypted data 150 received from optical transceiver 100 with the original data 150.

If the compared data match each other, then the host 111 will know that optical transceiver 100 is an authorized version and the host will continue to communicate with optical transceiver 100. However, if data 150 and data 156 do not match, then the host 111 will know that optical transceiver 100 is an unauthorized version and will not continue to communicate with the optical transceiver module. Alternatively, if the optical transceiver 100 is not an authorized version, the control module 105 may be configured to disable the optical transceiver 100 or to otherwise limit the use of the optical transceiver. If at a later time the optical transceiver 100 is authenticated, then the control module 105 may be configured to cause the optical transceiver 100 to become fully operational.

Figure 4:
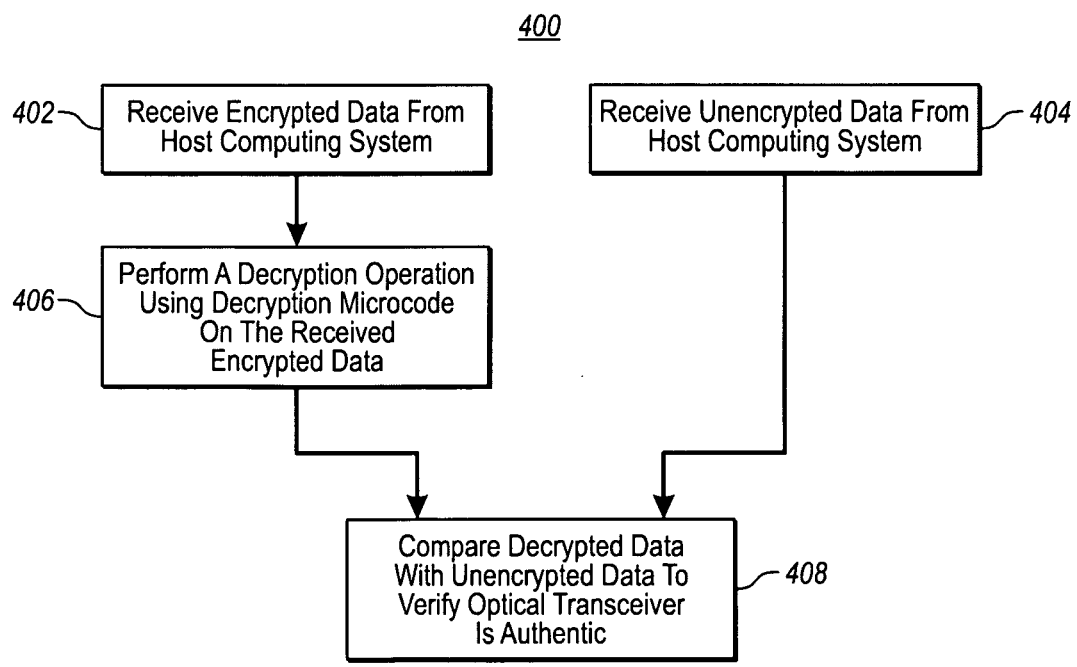
FIG. 4 illustrates a flowchart of an alternative method for an optical transceiver module to be authenticated in accordance with the principles of the present invention.

Reference is now made to FIG. 4, which shows a flowchart of a method 400 for an optical transceiver module to be authenticated by a host computing system. The method 400 is illustrated with respect to the environment of FIGS. 1 and 2. Note, however, that one of skill in the art will appreciate that the environment of FIGS. 1 and 2 is only one of countless environments in which the method 400 may be practiced and should not therefore be used to limit the scope of the appended claims.

The method 400 includes an act of receiving encrypted data from a host computing system (act 402) and an act of receiving unencrypted data from the host computing system (act 404). For example, the optical transceiver 100 may receive encrypted data 155 and unencrypted data 150 from the host 111. As mentioned, the host 111 may write the data 150 and 155 into persistent memory 106 or the control module 105 may write the data 150 and 155 into persistent memory 106. As will be appreciated, the encrypted data 155 will be an encrypted version of the unencrypted data 150 so that a valid comparison may be made. As may be seen from FIG. 4, the encrypted data 155 may be received before, at the same time, or after the unencrypted data 150.

The method 400 also includes an act of performing a decryption operation using decryption microcode to thereby decrypt the encrypted data (act 406). For example, control module 105, specifically processors 203, may execute the decryption microcode 120. Once executed, the decryption microcode 120 may cause the optical transceiver to perform the decryption operation to thereby decrypt the encrypted data 155 as previously described.

As mentioned, in some embodiments the decryption microcode 120 may include a decryption key 125 that is used in the decryption operation. In other embodiments, the decryption key 125 may be stored separate from the decryption microcode 120, for instance in system memory 206 and accessed by the decryption microcode 120. Regardless of where it is stored, the decryption key 125 may be used to help decrypt data 155.

The method 400 further includes an act of comparing the decrypted data with the unencrypted data to verify that the optical transceiver is authentic (act 408). For example, in some embodiments the control module 105 may compare the newly decrypted data with the unencrypted data 150 to see if the two match. In other embodiments, the host 111 may compare the newly decrypted data with the unencrypted data 150 to see if the two match. If the newly decrypted data matches the unencrypted data 150, then the host 111 will know that optical transceiver 100 is an authorized version and the host will continue to communicate with optical transceiver 100. However, if data 150 and data 156 do not match, then the host 111 will know that optical transceiver 100 is an unauthorized version and will not continue to communicate with the optical transceiver module. Alternatively, if the optical transceiver 100 is not an authorized version, the control module 105 may be configured to disable the optical transceiver 100 or to otherwise limit the use of the optical transceiver. If at a later time the optical transceiver 100 is authenticated, then the control module 105 may be configured to cause the optical transceiver 100 to become fully operational.

As mentioned above, in some embodiments the optical transceiver 100 will not be operable until it is authenticated by the host 111. For example, transmitter 104 may not operate as a high speed data link until the optical transceiver 100 is authenticated using either method 300 or 400 or some other reasonable method The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allowing an optical transceiver to be authenticated by a host computing system, the method comprising:
receiving data from the host computing system at the optical transceiver communicatively coupled to the host computing system, wherein the optical transceiver includes a processor and a persistent memory having thereon encryption/decryption microcode written to the persistent memory, by an authorized vendor, after manufacture of the optical transceiver that, when executed, causes the optical transceiver to perform an encryption operation or a decryption operation, wherein the encryption/decryption microcode accesses an encryption key that is generated by the authorized vendor and stored separately from the encryption microcode on the persistent memory when performing the encryption operation;
writing the data to the persistent memory of the optical transceiver by the host computing system;
after the data is written to the persistent memory, encrypting the data using the encryption/decryption microcode and the encryption key;
storing the encrypted data on the persistent memory;
providing the encrypted data from the persistent memory to the host computing system for verifying that the optical transceiver is associated with the authorized vendor, wherein the verifying that the optical transceiver is associated with the authorized vendor includes the host computing system decrypting the encrypted data received from the persistent memory and the host computing system determining whether the decrypted data matches the data previously sent to the optical transceiver;
in response to the host computing system verifying that the optical transceiver is associated with the authorized vendor causing, by a control module of the optical transceiver, the optical transceiver to become fully operational; and
in response to the host computing system verifying that the optical transceiver is not associated with the authorized vendor disabling, by the control module, the optical transceiver.

2. The method in accordance with claim 1, wherein causing the optical transceiver to become fully operational includes enabling a high speed data link of the optical transceiver.

3. A method for allowing authentication between an optical transceiver and a host computing system, the method comprising:
receiving encrypted data from the host computing system at the optical transceiver communicatively coupled to the host computing system, the data being encrypted by the host computing system independent of data elements received from the optical transceiver, wherein the optical transceiver includes a processor and a persistent memory having thereon decryption microcode written to the persistent memory, by an authorized vendor, after manufacture of the optical transceiver that, when executed, causes the optical transceiver to perform a decryption operation, wherein the decryption microcode accesses a decryption key that is generated by the authorized vendor and stored on the optical transceiver when performing the decryption operation;
receiving unencrypted data from the host computing system at the optical transceiver;
writing the unencrypted data and the encrypted data to the persistent memory of the optical transceiver by the host computing system;
after the unencrypted data and the encrypted data are written to the persistent memory, decrypting the encrypted data using the decryption microcode and the decryption key at the optical transceiver;
determining if the decrypted data matches the unencrypted data, at the optical transceiver, in order to verify that the optical transceiver is associated with the authorized vendor;
in response to the optical transceiver determining that the decrypted data matches the unencrypted data, causing, by a control module of the optical transceiver, the optical transceiver to become fully operational; and
in response to the optical transceiver determining that the decrypted data does not match the unencrypted data, disabling, by the control module, the optical transceiver.

4. The method in accordance with claim 3, wherein the decryption microcode accesses the decryption key that is stored separately from the decryption microcode on the persistent memory when performing the decryption operation.

5. The method in accordance with claim 3, wherein the decryption microcode assesses the decryption key that is stored in system memory of the control module.

6. The method in accordance with claim 3, wherein a high speed data link of the optical transceiver is configured to not operate until the optical transceiver is fully operational.

7. The method in accordance with claim 3, wherein the unencrypted data is received separately from the host computing system at the optical transceiver.

8. The method in accordance with claim 3, wherein the unencrypted data is received at the same time as the encrypted data.

9. The method in accordance with claim 3, wherein the encrypted data is received from the host computing system via a two-wire 12C serial interface.

10. An optical transceiver comprising:
a control module;
at least one processor included in the control module;
a first memory separate from the at least one processor, the first memory including at least one of an encryption key or a decryption key, wherein the at least one of the encryption key or the decryption key is generated by an authorized vendor; and
a second memory separate from the at least one processor, the second memory including at least one of encryption microcode or decryption microcode, wherein the encryption microcode or the decryption microcode is written to the second memory, by the authorized vendor, after manufacture of the optical transceiver and the encryption microcode or the decryption microcode includes processor-executable instructions that, when executed by the at least one processor, cause the at least one processor to encrypt or decrypt data received from a host computing system, wherein
the control module is configured to:
allow the data received from the host computing system to be written to the first memory by the host computing system;
in response to the data being written to the first memory, encrypt or decrypt the data using the respective encryption or decryption microcode and the respective encryption key or decryption key;

in response to encrypting the data, send the encrypted data to the host computing system such that the host computing system can decrypt the encrypted data to determine if the decrypted data matches the data previously sent by the host computing system to the optical transceiver in order to verify that the optical transceiver is associated with the authorized vendor;

in response to decrypting the data, determine if the decrypted data matches unencrypted data previously received by the host computing system in order to verify that the optical transceiver is associated with the authorized vendor;

in response to verifying that the optical transceiver is associated with the authorized vendor, cause the optical transceiver to become fully operational; and in response to verifying that the optical transceiver is not associated with the authorized vendor, disable the optical transceiver.

11. The optical transceiver in accordance with claim 10, wherein the processor-executable instructions cause the at least one processor to decrypt the data using decryption microcode and the decryption key; and to provide decrypted data to the host computing system for verification that the optical transceiver is authentic.

12. The optical transceiver in accordance with claim 10, wherein the second memory is a write-protected memory.

13. The optical transceiver in accordance with claim 10, wherein the first memory is system memory of the control module.

* * * * *